Oct. 10, 1944.    C. HUSSMAN    2,359,917
SHOCK AND VIBRATION ABSORBER
Filed July 21, 1942
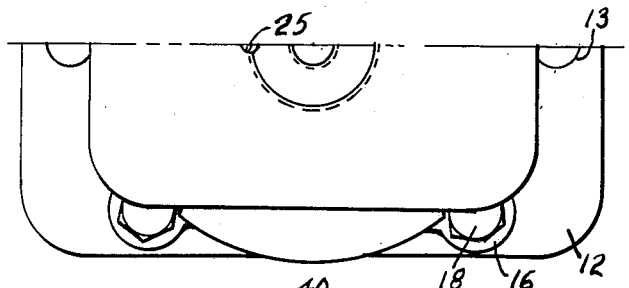
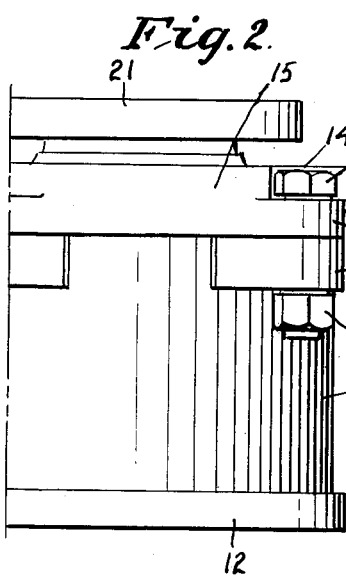
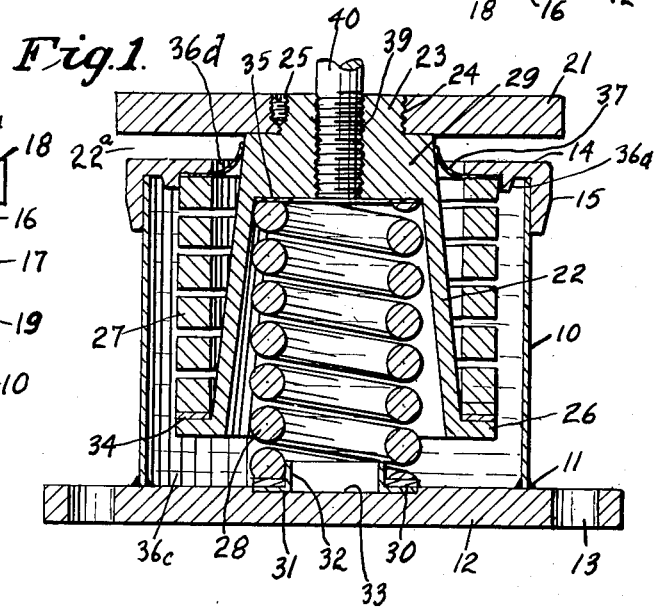
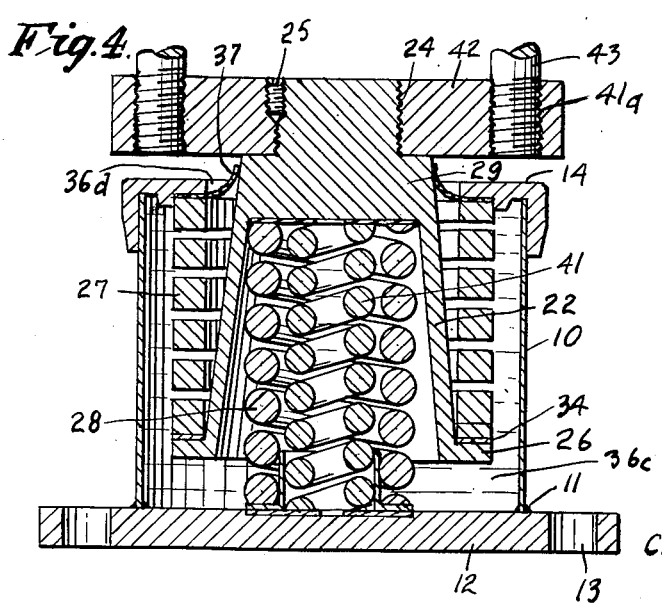
INVENTOR
CARL HUSSMAN
by L. A. Paley Att'y.

Patented Oct. 10, 1944

2,359,917

UNITED STATES PATENT OFFICE 2,359,917

SHOCK AND VIBRATION ABSORBER

Carl Hussman, Chicago, Ill.

Application July 21, 1942, Serial No. 451,795

8 Claims. (Cl. 248—20)

This invention relates to machine base mountings for engines and other machinery subject to vibration, said mountings being adapted to absorb infrequent shocks and also steady vibrations.

When submarine and surface war vessels are attacked with depth bombs or aerial bombs, or subjected to certain other destructive instruments, the propelling engines are apt to tear loose from their mountings so that the vessel is unable to escape from further attack. Propelling engines of vessels are also subject to steady vibrations due to the movements of their working parts, and if unchecked, these vibrations will cause the entire vessel to vibrate and cause great discomfort to the crew and passengers, as well as undue wear on the working parts of the engines.

An object of the invention therefor, is to provide mountings for engines and other machinery which will absorb the steady vibrations of the working parts and prevent the transfer of the vibrations to the hull of the vessel.

Another object of the invention is to provide an engine mounting which will also absorb shocks due to the explosion of bombs, torpedoes or other instruments of destruction; also to improve mountings for engines or other machinery in other respects hereinafter specified and claimed.

Reference is to be had to the accompanying drawing forming a part of this specification, in which Fig. 1 is a central sectional elevation showing my improved machine base, Fig. 2 is a fragmentary elevation of the machine base, Fig. 3 is a fragmentary plan view of the machine base, and Fig. 4 is a central sectional elevation of a modified form of the base.

Referring to the drawing by numerals, a hollow cylindrical member or chamber 10 is arranged with axis extending vertically and is secured, as by welds 11 to a base plate 12. Bolt holes 13 are formed in the plate 12 for attachment to a floor by bolts not shown. A cover 14 is provided with a downstanding annular flange 15 which removably fits around the upper end of cylinder 10. Outstanding lugs 13 are formed around the flange 15 and registering lugs 17 are formed on the cylinder 10, the lugs 16 and 17 being rigidly connected by bolts 18 and nuts 19. A platform plate 21 is positioned above the cover 14 a distance or clearance 22a. A frusto-conical bell-shaped cup 22 supports the plate 21 and telescopes into the cylinder 10, being provided with a threaded section 23 which screws into a threaded opening 24 in the plate 21. A locking screw 25 prevents the plate from being inadvertently unscrewed from the section 23. An outstanding annular flange 26 is formed around the lower end of cup 22 and a square helical spring 27 is compressed between the flange 26 and cover 14. A round helical spring 28 is compressed between the top 29 of the cup 22 and an annular washer 30 supported on an outstanding flange 31 formed on a spring retainer sleeve 32. The flange 31 is seated in an annular depression 33 formed in the top surface of plate 12. A washer 34 is interposed between the bottom of spring 27 and flange 26, and a washer 35 extends between the top of spring 28 and the cup top 29. A downwardly extending annular flange 36a is formed on the bottom surface of cover 14 to hold the top of spring 27 in a central position.

The entire space inside cylinder 10 and cup 22 is filled with a heavy asphalt 36c or other thermo-plastic semi-solid material which is poured into the space in a heated and fluid condition and then allowed to cool and partially or wholly solidify depending on the results desired. The cup 22 extends through a central opening 36d formed in the cover 14 and an annular wire screen 37 or other foraminous material covers the space between cup top 29 and cover 14 so as to permit air to escape from the space but prevent the asphalt from flowing out of said space as it might if the machine base is shipped in inverted, heated condition. The screen 37 is retained in place between the top of spring 27 and cover 14. A central threaded bolt hole 39 is formed centrally in the cup top 29 and section 23 to receive a tap bolt 40 for attaching an engine or other machine (not shown) to the plate 21.

It will be seen that both springs 27 and 28 are compressed as nuts 19 are tightened and cover 14 is forced downwardly into contact with the top of cylinder 10. The cup 22 and plate 21 is then floating between the opposed pressure of springs 27 and 28. Steady vibrations of the machine supported on plate 21 serve to alternately increase and decrease the compression in springs 27 and 28, thus absorbing the vibrations of said machine and preventing the passage of said vibrations to base plate 12 and the hull of a ship or other support. In the event of a sudden shock, as that caused by the explosion of a bomb above, below or to one side of a vessel, the semi-solid 36c plays a highly important part in checking the movement of the ship's engine or other machine, and in preventing the engine from tearing loose from its mountings and disabling the ship. When submarine vessels are attacked by depth bombs, the hull is usually suddenly driven upwardly. The sloping wall of the cup 22 then acts to compress the asphalt and retard its flow outwardly under the flange 26. The asphalt also crowds in between the coils of spring 28 and acts to prevent the compression of said spring. The maximum movement permitted is governed by the plate 21 contacting the top of cover 14 so that space 22a is zero. When the bomb explodes above a vessel, the hull is driven downwardly and distance 22a increases while spring 27 is further compressed. However, the asphalt lies between the coils of spring 27 and greatly retards the compression of said spring 27 until the asphalt is completely squeezed out from the coils of said spring 27 and the coils make metallic contact and positively check all further increase of distance 22a. If a bomb explodes to one side of the vessel, sideway movement is checked by the sideways action of the cup 22 on the semi-solid asphalt until the flange 26 contacts the inside surface of cylinder 10 to act as a positive limiting stop.

It should be understood that a plurality of engine mountings as above described are commonly used under an engine to provide a suitable load-bearing capacity for the engine. In many cases, one side of the engine will be heavier than the other side, so in order to provide for this variation in weight, I increase or decrease the thickness of washer 30 to vary the compression in spring 28. When this means will not provide enough variation in loading capacity, I provide the modified form of mounting as shown in Fig. 4.

This mounting as shown in Fig. 4 is substantially identical to the mounting previously described except that an inner spring 41 is provided inside the spring 28 to increase the load bearing capacity of said spring 28. This form of mounting also shows threaded bolt holes 41a passing through the plate 42 so as to receive tap bolts 43 used in attaching the engine or other machine to the plate 42.

I find that the design described permits the parts of the mounting to be identical for resisting shocks of 5 g. or 10 g., only a change in size of springs 27 and 28 being necessary since the semi-solid asphalt 36c resists most of the shocks. The mountings may be conveniently designed so that the maximum permissible deflection, or distance 22a, is equal to ⅜".

I would state in conclusion that while the illustrated examples constitute a practical embodiment of my invention, I do not wish to limit myself precisely to these details, since manifestly, the same may be considerably varied without departing from the spirit of the invention as defined in the appended claims.

Having thus described my invention, I claim as new and desire to secure by Letters Patent:

1. In a device of the class described, a pair of spaced plates, a hollow chamber extending from one of said plates to point spaced apart from the second of said plates, a frusto-conical member extending from the second of said plates into said chamber, cylindrical helical springs associated with said member, and a semi-solid fluid material in said chamber around said member and springs.

2. In a device of the class described, a frusto-conical member, means for attaching said member to a vibrating part, spring means for supporting said member, means for supporting said spring means, and a semi-solid fluid material surrounding said spring means and member for damping the vibration of said member under shock.

3. In a machine mounting, a pair of spaced plates arranged for relative movement, a cup secured to one of said plates and having the open mouth of said cup extending toward the second of said plates, a chamber extending from the second plate toward the first of said plates and surrounding said cup, spring means associated with said cup and chamber, and a semi-solid fluid material in said chamber and cup and surrounding said spring means.

4. In an engine mounting, a platform plate and a substantially parallel base plate, a hollow chamber extending from said base plate to within a short distance of said platform plate, a hollow member supporting said platform plate and loosely telescoping into said chamber, spring supporting means connecting said chamber and member, a semi-solid fluid material in said chamber around said hollow member and spring means, and a foraminous material adapted to retain said semi-solid material in said chamber.

5. In an engine mounting, a pair of spaced, substantially parallel plates, telescoping, relative movable hollow members between said plates supporting one of the latter above the other, a pair of concentric helical springs floatingly connecting said hollow members, and a semi-solid fluid material within said hollow members and surrounding said springs.

6. In an engine mounting, a pair of spaced, substantially parallel plates, a hollow chamber extending from one of said plates, a bell-shaped hollow member extending from said second plate inside of said chamber in telescoping relation, an outstanding annular flange formed on the enlarged end of said bell-shaped member, a cover over a portion of said chamber and surrounding said bell-shaped member, a square helical spring between said cover and said flange, a concentric round helical spring extending between said bell-shaped member and said first plate, and a semi-solid fluid material within said chamber and surrounding said bell-shaped member and said springs.

7. In an engine mounting, a pair of spaced plates in substantially parallel relation, a hollow chamber extending from one of said plates to within a short distance of the second of said plates, a bell-shaped member and a plurality of supporting springs within said chamber, said bell-shaped member being secured to said second plate, a cover partly closing the end of said chamber and loosely fitting around said bell-shaped member, bolt means for drawing said cover onto said chamber for compressing said springs, and a semi-solid fluid material within said chamber.

8. In an engine mounting, a pair of spaced plates in substantially parallel relation, a hollow chamber extending from one of said plates to within a short distance of the second of said plates, a bell-shaped member secured to said second plate and telescoping into said chamber, a square helical spring within said chamber and resiliently connecting said chamber and bell-shaped member, a plurality of concentric round helical springs within said bell-shaped member resiliently supporting the latter above the first mentioned plate, and a semi-solid fluid material in said chamber and surrounding said springs and bell-shaped member.

CARL HUSSMAN.